Aug. 26, 1947.                D. D. KREBS                2,426,275
APPARATUS FOR SWEDGING SCREWS ON OPHTHALMIC MOUNTINGS
Filed Oct. 23, 1942
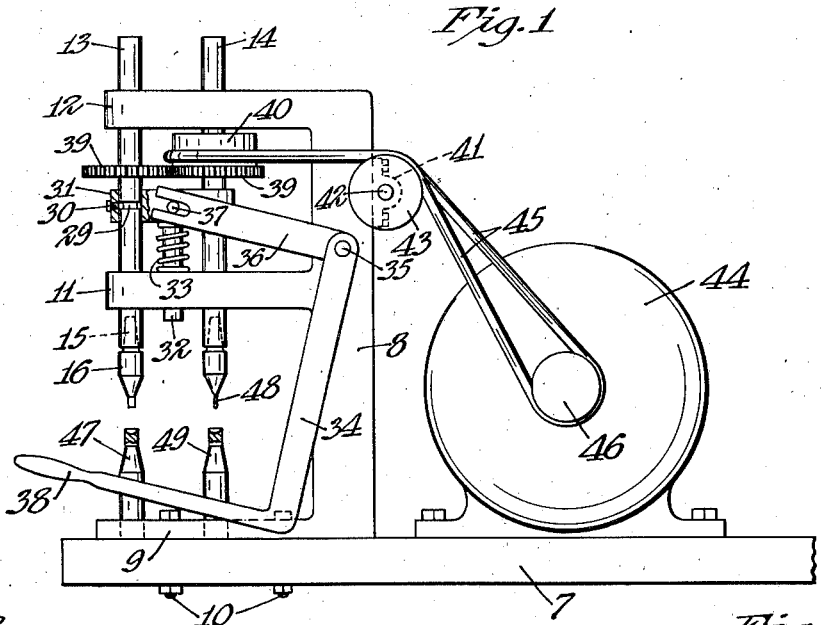
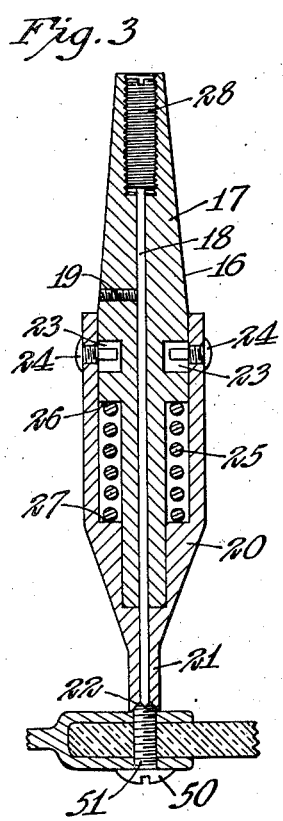
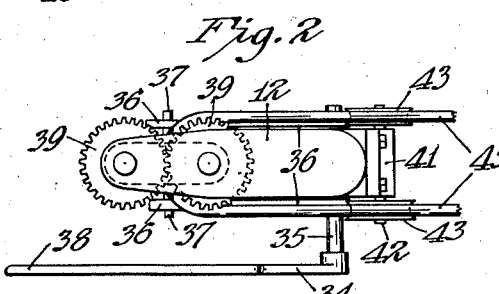
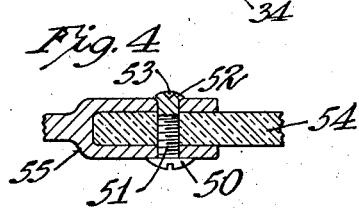
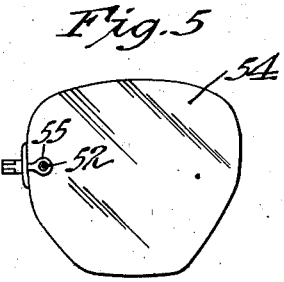
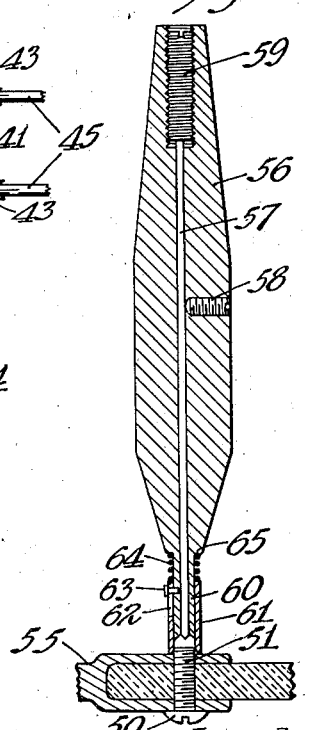
Inventor
Daniel D. Krebs
By Williamson & Williamson
Attys.

Patented Aug. 26, 1947

2,426,275

UNITED STATES PATENT OFFICE 2,426,275

APPARATUS FOR SWEDGING SCREWS ON OPHTHALMIC MOUNTINGS

Daniel D. Krebs, Albert Lea, Minn., assignor, by mesne assignments, to Leslie W. Myers, Will R. Anderson, John R. Nelson, Albert L. Anderson, and N. P. Benson, all of Minneapolis, Minn., and Charles L. Waldo, Duluth, Minn., and Robert E. Lindmark, Eau Claire, Wis., copartners doing business as Cosmet Company, Minneapolis, Minn.

Application October 23, 1942, Serial No. 463,138

2 Claims. (Cl. 78—49)

This invention relates to means for preventing screws in ophthalmic mountings from becoming loosened.

Persons acquainted with the manufacture and maintenance of eye glasses having temples pivotally secured thereto as well as the wearers of such optical devices have for many years been aware of the fact that the screws used to pivotally attach the temples to the lenses frequently become loose and require periodic attention. The difficulty is much more apparent with eye glasses which have temples attached thereto but it is also present in the screw connections between the lenses and the bridge or nose piece.

It is a general object of my invention to provide an apparatus for operating on screw connections in ophthalmic mountings whereby loosening of the screws is prevented.

More specifically it is an object of the invention to provide a means for swedging the threaded end of such screws in such a manner that a portion of the end of the screw is deformed to overlie that part of the ophthalmic mounting through which it extends so that reverse movement of the screw is positively prevented.

A more specific object of the invention is to provide a means for displacing metal from the central portion of the end of the screw in an ophthalmic mounting outwardly beyond the normal diametric limits of the screw end so that a bead is formed against the mounting to securely lock the screw in position.

It is a further object of the invention to provide means whereby the comparatively small screw of an ophthalmic mounting is properly centered relative to the swedging tool and is firmly held in place in such a way that the lens will not be cracked or broken.

These and other objects and advantages of the invention will more fully appear from the following description made in connection with the accompanying drawings, wherein like reference characters refer to the same parts throughout the views, and, in which:

Fig. 1 is a side elevation of the apparatus in position to receive an ophthalmic mounting;

Fig. 2 is a top plan of the apparatus with the motor not shown;

Fig. 3 is an enlarged vertical section through the swedging head with a portion of a lens end mounting in position for swedging;

Fig. 4 is an enlarged fragmentary sectional view of a mounting which has been treated in accordance with my invention;

Fig. 5 is a front elevation of a lens with a mounting thereon; and

Fig. 6 is an enlarged vertical sectional view of a modified form of swedging head.

In Fig. 1 there is shown a base 7 having a bracket 8 secured thereto and extending upwardly therefrom. The bracket 8 has a horizontally extending foot 9 which is connected to the base 7 by means of nutted bolts 10. Said bracket 8 has an intermediate horizontal extension 11 and an upper horizontal extension 12. A pair of rounded and elongated shanks 13 and 14 are journaled in the horizontal bracket extensions 11 and 12 and adapted to be reciprocated longitudinally. Said shanks 13 and 14 are also capable of rotation in the horizontal extensions 11 and 12.

The shank 13 is provided with a chuck or socket 15 in its lower end to receive a swedging head generally indicated at 16. The swedging head 16 has a main body portion 17 which is longitudinally bored to receive a swedging pin 18 which is anchored in said body 17 by means of a set screw 19.

A centering cap 20 has a sleeve-like portion 21 which is slidably fitted over the body 17 of the swedging head 16 and the lower portion of said centering cap 20 is reduced as shown at 21. The bottom of the reduced portion 21 of the centering cap 20 is provided with a cup-like shape as shown at 22 which preferably is in the form of a frusto-conical depression with its walls tapering inwardly and toward each other from the bottom of said reduced centering cap portion 21. The swedging pin 18 in its normal position lies approximately as shown in Fig. 3 at the lower part of the frusto-conical depression 22. The body 17 of the swedging head 16 is provided with a pair of inwardly cut notches 23 to accommodate small bolts 24 which are threaded in the upper sleeve-like portion 21 of the centering cap 20 and said bolts 24 are somewhat smaller than the height of said notches 23 so that the centering cap 20 can move a limited degree vertically with respect to body 17 of the swedging head 16. As a result the centering cap 20 can also be moved vertically relative to the swedging pin 18. A compression spring 25 is interposed between a shoulder 26 on the main body 17 of the swedging head 16 and a shoulder 27 at the bottom of the sleeve-like portion 21 of the centering cap 20. The spring 25 normally urges the centering head 20 downwardly to the full limit of its movement relative to the swedging pin 18 and the body 17 of said swedging head.

In order to adjustably fix the position of the swedging pin 18 relative to the body 17 and more particularly the reduced lower portion 21 of the centering cap 20 there is provided a swedging pin positioning screw 28 in the upper portion of the body 17. The screw 28 provides a firmer positioning means than the set screw 19, the latter being used principally to prevent relative rotation between the swedging pin 18 and the swedging head body 17.

The two shanks 13 and 14 shown in Fig. 1 are provided with circumferential grooves 29 to receive pins 30 in a block 31 through which the shanks 13 and 14 pass and in which said shanks are adapted to rotate. The channel and pin structure is shown in Fig. 1 only in respect to the shank 13, but it is to be understood that the construction is duplicated in connection with the shank 14.

The block 31 has a post 32 extending downwardly therefrom and through the intermediate bracket extension 11 and adapted for vertical reciprocation in said extension 11. A compression spring 33 normally urges the block 31 and the pins 13 and 14 upwardly. A hand lever 34 is pivotally connected to a bracket 8 by means of a shaft 35 which extends through said bracket. A pair of forked arms 36 extend from the shaft 35 at either side of the bracket 8, and said arms 36 are adapted to fit over a pair of pins 37 extending from opposite sides of the block 31. The lower end of the lever 34 is provided with a lateral extension 38 which is adapted to be grasped by the operator and pressed down to move the block 31 and shanks 13 and 14 downwardly, the spring 33 being adapted to return said block 31 and shanks 13 and 14 to their upper limit of movement when the handle 38 is released.

The two shanks 13 and 14 are connected together by gears 39 and the shank 14 has a pulley 40 mounted thereon. Adjacent the upper end of the bracket 8 is a bearing 41 carrying a shaft 42 and a pair of pulleys 43 is mounted on opposite ends of said shaft 42.

A motor 44 is shown mounted on the base 7 adjacent the bracket 8 and a flexible belt 45 extends from a pulley 46 on the motor 44, over the pulleys 43 and around the pulley 40 on the shank 14. Thus the motor 44 will rotate both shanks 13 and 14 through their interconnecting gearing 39.

Mounted on the lower lateral extension or foot 9 forming a part of the bracket 8 is a cup-like mandrel 47. The mandrel 47 is in direct alignment with the swedging head 16 and is of such height that when the lever 34 is depressed the shank 13 will be brought down into close proximity with said mandrel 47.

The shank 14 illustrated in Fig. 1 carries a downwardly extending drill 48 which is disposed above and in alignment with a mandrel 49 supported by the foot or lower extension 9 on the bracket 8.

When it is desired to swedge a screw in an ophthalmic mounting the mounting is placed over the cup-like mandrel 47 with the head 50 of the screw 51 resting in said cup-like mandrel. The handle 38 of the lever 34 is then pressed down with the motor 44 running and the shanks 13 and 14 rotating. As the swedging head 16 on shank 13 is brought downwardly the lower end of the centering cap 20 fits over the end of the screw 51, and because of the frusto-conical depression in the end of said reduced portion 21 of the centering cap 20 the screw is aligned properly with the swedging pin 18 and continued downward movement of the swedging head 16 will cause the swedging pin 18 to press against the center of the end of said screw 51. Continued pressure plus rotation of the pin 18 with the swedging head 16 gradually causes the pin 18 to penetrate the end of the screw and a certain amount of metal in said screw end will flow outwardly as at 52 leaving the small depression 53 in the end of the screw. This is best illustrated in Fig. 4 wherein a portion of a lens is indicated at 54, a portion of an ophthalmic mounting is shown at 55, and part of the end of the screw is shown overlapping or overlying said mounting 55.

In Fig. 6 there is shown a modified form of swedging head 56 having a swedging pin 57 secured by a set screw 58 and held in proper position by the larger set screw 59. The swedging head 56 is provided with a reduced lower portion 60 through which the pin 57 extends, and about the reduced lower portion 60 on the swedging head 56 is a sleeve 61 which is adapted for limited longitudinal sliding movement on said reduced swedging head portion 60 by virtue of a slot 62 in the sleeve 61 and a pin 63 which extends through said slot and into said reduced head portion 60. In this embodiment the sleeve 61 fits snugly around the screw 51 in the ophthalmic mounting 55 in order to properly center the swedging pin 57 relative to the end of said screw 51.

The structure and operation of the swedging mechanism has been described above. It is sometimes necessary to remove a screw from a mounting to replace broken parts, etc., and for that reason I have provided the drill 48 mounted in the shank 14 so that the screw 51 can be drilled from the mounting. In such an event the drill 48, of course, would have to closely approach the diameter of the screw such as the screw 51 and the screw head 50 would be seated in the cup-like mandrel 49. If desired the mandrel 48 could be equipped with a centering device such as is used on the swedging heads of said Figs. 3 and 6 in order to properly hold the drill during the drilling operation, but it is ordinarily not necessary because of the fact that the screw 51 has the depression 53 formed in its ends. This is generally sufficient to properly center the drill relative to the screw.

From the foregoing description it will be seen that I have provided an apparatus for swedging the ends of small screws in relatively delicate ophthalmic mountings in such a manner that the screw cannot be loosened and further in a manner which is not likely to do injury to the delicate lens 54 and mounting 55. The apparatus is simple in construction and because of the centering device associated with the swedging pin it can be operated by workmen of ordinary mechanical training with more or less safety. It provides means for operating on ophthalmic mountings so that there is no danger of the screws in the mountings working loose and causing discomfort to the wearer of the eye glasses and possible loss or breakage of any parts of the glasses.

It will, of course, be understood that various changes may be made in the form, details, arrangement and proportions of the various parts without departing from the scope of my invention.

What is claimed is:

1. Apparatus for swedging screws in ophthalmic mountings which includes, a mandrel for receiving the screw head, a swedging pin movable toward and away from said mandrel, a centering device movable with said pin for engaging said screw to align it with said pin, and means for rotating said pin and centering device.

2. Apparatus for swedging screws in ophthalmic mountings which includes, a cup-like mandrel for receiving the head of a screw, a swedging pin movable toward and away from said mandrel, a centering device movable with said pin for engaging said screw to align it with said pin, and means for rotating said pin and said centering device.

DANIEL D. KREBS.

REFERENCES CITED

The following references are of record in the file of this patent:

UNITED STATES PATENTS

| Number | Name | Date |
|---|---|---|
| 833,441 | Caskey | Oct. 16, 1906 |
| 1,885,986 | Butler | Nov. 1, 1932 |
| 2,121,669 | Rochte | June 21, 1938 |
| 938,083 | Spaar | Oct. 26, 1909 |
| 1,787,076 | Kalgren | Dec. 30, 1930 |
| 2,244,073 | Lyon | June 3, 1941 |
| 2,302,967 | Marsh | Nov. 24, 1942 |
| 942,637 | Greiner | Dec. 7, 1909 |
| 1,966,295 | Heilman | July 10, 1934 |
| 2,156,167 | Snyder et al. | Apr. 25, 1939 |

FOREIGN PATENTS

| Number | Country | Date |
|---|---|---|
| 512,924 | Germany | 1930 |